US011512209B2

(12) United States Patent
Okumura et al.

(10) Patent No.: US 11,512,209 B2
(45) Date of Patent: Nov. 29, 2022

(54) ANTIFOULING COATING COMPOSITION, OPTICAL MEMBER, AND LIGHT FIXTURE

(71) Applicant: Panasonic Intellectual Property Management Co., Ltd., Osaka (JP)

(72) Inventors: Shin Okumura, Osaka (JP); Kazuhiko Honjo, Osaka (JP); Shuhei Uchiyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/049,638

(22) PCT Filed: Apr. 22, 2019

(86) PCT No.: PCT/JP2019/016956
§ 371 (c)(1),
(2) Date: Oct. 22, 2020

(87) PCT Pub. No.: WO2019/208475
PCT Pub. Date: Oct. 31, 2019

(65) Prior Publication Data
US 2021/0253877 A1    Aug. 19, 2021

(30) Foreign Application Priority Data

Apr. 26, 2018    (JP) .............................. JP2018-085833

(51) Int. Cl.
*C09D 5/24* (2006.01)
*G02B 1/18* (2015.01)
(Continued)

(52) U.S. Cl.
CPC ................ *C09D 5/24* (2013.01); *C09D 7/61* (2018.01); *C09D 7/67* (2018.01); *C09D 7/68* (2018.01);
(Continued)

(58) Field of Classification Search
CPC .............. C09D 5/24; C09D 7/61; C09D 7/67; C09D 7/68; C09D 127/12; C09D 133/04; C09D 183/04; G02B 1/18
See application file for complete search history.

(56) References Cited

U.S. PATENT DOCUMENTS 8,048,218 B2 * 11/2011 Nakamura ........... C09D 133/10
106/481
10,150,824 B2 * 12/2018 Nakao .................... C09D 5/024
(Continued)

FOREIGN PATENT DOCUMENTS

CN           1566235 A      1/2005
CN         100572470 C     12/2009
(Continued)

OTHER PUBLICATIONS

Chinese Office Action issued by CNIPO for corresponding Chinese patent application No. 201980028246.0 dated Jun. 25, 2021, with an English translation.
(Continued)

*Primary Examiner* — Mary Ellen Bowman
(74) *Attorney, Agent, or Firm* — Renner, Otto, Boisselle & Sklar, LLP

(57) ABSTRACT

The solid content contains a resin component (A) and a filler (B). The resin component (A) includes at least one of a fluorine-containing copolymer (a1) or a silicon-containing copolymer (a2). The fluorine-containing copolymer (a1) includes a fluorine-containing segment and an acrylic segment containing no fluorine or silicon. The silicon-containing copolymer (a2) includes a silicon-containing segment and an acrylic segment containing no fluorine or silicon. The filler (B) has a mean particle size falling within a range from 10 nm to 200 nm.

8 Claims, 3 Drawing Sheets

(51) Int. Cl.
  *C09D 7/61* (2018.01)
  *C09D 7/40* (2018.01)
  *C09D 127/12* (2006.01)
  *C09D 133/04* (2006.01)
  *C09D 183/04* (2006.01)
  *C08K 3/36* (2006.01)
  *C08K 3/22* (2006.01)
  *F21V 8/00* (2006.01)

(52) U.S. Cl.
  CPC ......... *C09D 127/12* (2013.01); *C09D 133/04* (2013.01); *C09D 183/04* (2013.01); *G02B 1/18* (2015.01); *C08K 3/36* (2013.01); *C08K 2003/2241* (2013.01); *C08K 2003/2282* (2013.01); *C08K 2201/001* (2013.01); *C08K 2201/005* (2013.01); *C08K 2201/011* (2013.01); *G02B 6/0011* (2013.01)

(56) References Cited

U.S. PATENT DOCUMENTS

| | | |
|---|---|---|
| 2002/0043012 A1 | 4/2002 | Shibata et al. |
| 2005/0158504 A1 | 7/2005 | Itoh et al. |
| 2007/0129478 A1 | 6/2007 | Nakamura |
| 2010/0120970 A1 | 5/2010 | Biggs et al. |
| 2016/0200937 A1 | 7/2016 | Hu et al. |
| 2019/0077972 A1 | 3/2019 | Hu et al. |
| 2021/0189152 A1 | 6/2021 | Hu et al. |

FOREIGN PATENT DOCUMENTS

| | | |
|---|---|---|
| JP | S62025104 A | 2/1987 |
| JP | 2000-007995 A | 1/2000 |
| JP | 2005-179613 A | 7/2005 |
| JP | 2006-063132 A | 3/2006 |
| JP | 2007-119765 A | 5/2007 |
| JP | 2007-238834 A | 9/2007 |
| JP | 2009-279566 A | 12/2009 |
| JP | 2010-512444 A | 4/2010 |
| JP | 2011-110455 A | 6/2011 |
| JP | 2011-207170 A | 10/2011 |
| JP | 2017-534724 A | 11/2017 |
| WO | 2005/075583 A1 | 8/2005 |
| WO | 2009/084356 A1 | 7/2009 |
| WO | 2010/078046 A2 | 7/2010 |
| WO | 2010/078289 A2 | 7/2010 |
| WO | 2016/058104 A1 | 4/2016 |

OTHER PUBLICATIONS

International Search Report for corresponding Application No. PCT/JP2019/016956, dated Jul. 30, 2019.
Written Opinion for corresponding Application No. PCT/JP2019/016956, dated Jul. 30, 2019.
Extended European Search Report for corresponding European patent application No. 19791755.2, dated May 12, 2021.
Japanese Office Action for corresponding Japanese Patent Application No. 2020-516331 dated Mar. 1, 2022, with English translation.
Buju Jiang, "Practical Melt Mold Casting Technique", Practical Casting Technique Book, Liaoning Science and Technology Publishing House, Shenyang, 2008, and English Translation.
Chinese Office Action for corresponding Chinese Patent Application No. 201980028246.0 dated May 5, 2022, with English translation.
Japanese Office Action for corresponding Japanese Patent Application No. 2020-516331 dated Sep. 13, 2022, with English translation.

* cited by examiner

ANTIFOULING COATING COMPOSITION, OPTICAL MEMBER, AND LIGHT FIXTURE

TECHNICAL FIELD

The present disclosure generally relates to an antifouling coating composition, an optical member, and a light fixture, and more particularly relates to an antifouling coating composition for making an antifouling coating film, an optical member including the antifouling coating film, and a light fixture including the optical member.

BACKGROUND ART

Techniques for imparting antifouling properties are required in various scenes in life. For example, adhesion of foreign particles to the illuminating cover of a light fixture affects the cosmetic appearance of the light fixture and decreases the intensity of light emitted from the light fixture. To overcome these problems, those techniques for imparting antifouling properties have been provided.

For example, Patent Literature 1 discloses an antifouling painting composition containing: an antistatic agent including a salt of an anion and a cation; a fluorine-based resin having a hydroxyl group; a silicone-modified acrylic resin having a hydroxyl group; and an organic solvent.

According to Patent Literature 1, the antifouling painting composition contains a fluorine-based resin and an antistatic agent including a salt of an anion and a cation. Thus, they say that the antifouling painting composition should be used to form a layer exhibiting excellent antifouling properties against oil stain and adhesion of dust.

According to the technique disclosed in Patent Literature 1, a layer with antifouling properties is imparted with not only oil repellency by the fluorine-based resin but also antistatic property by the antistatic agent. However, that alone may not be effective enough to sufficiently reduce the adhesion of dust and oily components on the layer with antifouling properties.

CITATION LIST

Patent Literature

Patent Literature 1: WO 2009/084356 A1

SUMMARY OF INVENTION

The problem to be overcome by the present disclosure is to provide an antifouling coating composition that may be used to make an antifouling coating film that reduces the adhesion of dust and oily components thereon, an optical member including such an antifouling coating film, and a light fixture including such an optical member.

Solution for Problem

An antifouling coating composition according to an aspect of the present disclosure may be used to make an antifouling coating film. The antifouling coating composition contains a solid content which is a constituent component of the antifouling coating film. The solid content contains a resin component (A) and a filler (B). The resin component (A) includes at least one of a fluorine-containing copolymer (a1) or a silicon-containing copolymer (a2). The fluorine-containing copolymer (a1) includes a fluorine-containing segment and an acrylic segment containing no fluorine or silicon. The silicon-containing copolymer (a2) includes a silicon-containing segment and an acrylic segment containing no fluorine or silicon. The filler (B) has a mean particle size falling within a range from 10 nm to 200 nm.

An optical member according to another aspect of the present disclosure includes: a substrate having light transmitting properties; and an antifouling coating film covering the substrate and made of the antifouling coating composition described above.

A light fixture according to still another aspect of the present disclosure includes: the optical member; and a light source to irradiate the optical member with light.

DESCRIPTION OF EMBODIMENTS

An exemplary embodiment of the present disclosure will be described.

Figure 1:
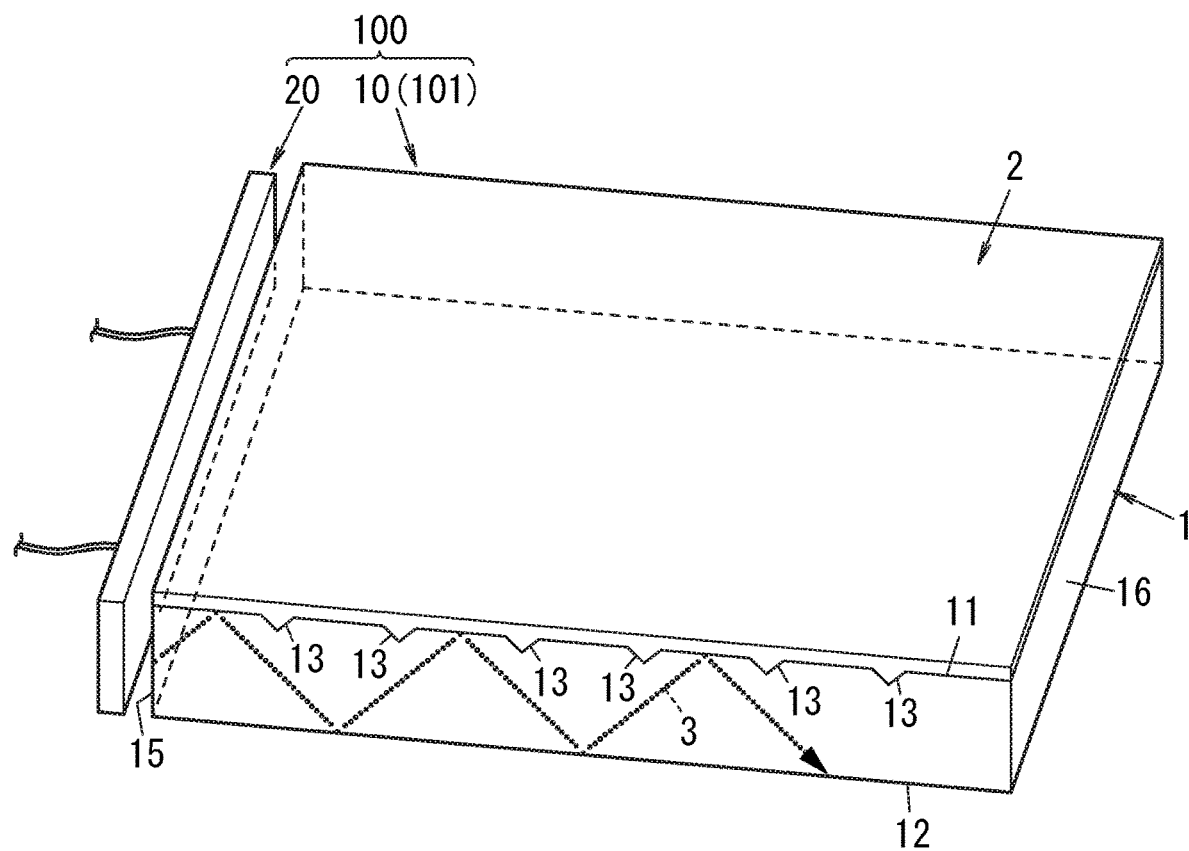
FIG. 1 is a perspective view schematically illustrating an optical member and light fixture according to an exemplary embodiment of the present disclosure.

An antifouling coating composition according to an exemplary embodiment contains a solid content which is a constituent component of an antifouling coating film 2 (see FIG. 1). The solid content contains a resin component as Component (A) (hereinafter referred to as "resin component (A)"; the same notation will be used in the rest of the description) and a filler (B). The resin component (A) includes at least one of a fluorine-containing copolymer (a1) or a silicon-containing copolymer (a2). The fluorine-containing copolymer (a1) includes a fluorine-containing segment and an acrylic segment containing no fluorine or silicon. The silicon-containing copolymer (a2) includes a silicon-containing segment and an acrylic segment containing no fluorine or silicon. The filler (B) has a mean particle size falling within the range from 10 nm to 200 nm.

The antifouling coating composition suitably further contains an electrical conductivity imparting component (C). The electrical conductivity imparting component (C) expresses electrical conductivity in the antifouling coating film 2.

Making an antifouling coating film 2 of the antifouling coating composition imparts the antifouling coating film 2 with oil repellency derived from the resin component (A) and with surface unevenness derived from the filler (B). That is to say, this allows the antifouling coating film 2 to have oil repellency and surface unevenness. Thus, the antifouling coating film 2 with oil repellency reduces adhesion of oily components thereon. In addition, the antifouling coating film 2 with surface unevenness reduces adhesion of dust thereon. This allows the antifouling coating film 2 to exhibit excellent antifouling properties.

Furthermore, adding the electrical conductivity imparting component (C) to the antifouling coating composition imparts electrical conductivity, derived from the electrical conductivity imparting component (C), to the antifouling coating film 2. In that case, the antifouling coating film 2 having electrical conductivity exhibits antistatic properties, thus further reducing the adhesion of dust thereon.

The respective components of the antifouling coating composition will be described more specifically.

The solid content is a component that constitutes the antifouling coating film 2 when the antifouling coating film 2 is made of the antifouling coating composition. The solid content in the antifouling coating composition does not have to be solid but may include liquid components. Note that the antifouling coating composition may further contain a solvent and other components as additional components other than the solid content or may contain only the solid content. The solid content contains the resin component (A), the filler (B), and the electrical conductivity imparting component (C) as described above.

The resin component (A) is made of at least one of the fluorine-containing copolymer (a1) or the silicon-containing copolymer (a2). Optionally, the antifouling coating composition may further contain a resin (a3) other than the fluorine-containing copolymer (a1) and the silicon-containing copolymer (a2). In that case, the resin (a3) is not counted in the resin component (A).

The resin component (A) may impart oil repellency to the antifouling coating film 2 as described above using either a fluorine-containing segment (a11) included in the fluorine-containing copolymer (a1) or a silicon-containing segment (a21) included in the silicon-containing copolymer (a2). In addition, the resin component (A) may also impart water repellency to the antifouling coating film 2 using either the fluorine-containing segment (a11) included in the fluorine-containing copolymer (a1) or the silicon-containing segment (a21) included in the silicon-containing copolymer (a2).

The fluorine-containing copolymer (a1) includes the fluorine-containing segment (a11) and an acrylic segment (a12) containing no fluorine or silicon. That is to say, the fluorine-containing copolymer (a1) is a block copolymer.

The fluorine-containing segment (a11) is formed by polymerizing together a plurality of radical-polymerizable monomers (b11) including a fluorine-containing monomer (b111), for example. The monomer (b111) includes an acrylic monomer including a fluoroalkyl group, for example. The acrylic monomer including a fluoroalkyl group may be expressed by the following Formula (1):

[Chemical Formula 1]

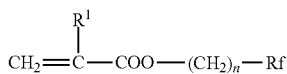

(1)

In Formula (1), $R^1$ represents a hydrogen atom, a methyl group, a fluorine atom, or a chlorine atom. In Formula (1), Rf represents a perfluoroalkyl group. Rf is represented by, for example, $(CF_2)_m CF_3$, where m is a positive number (e.g., 5) and n is an integer of 1 to 18.

Optionally, the monomer (b11) may further contain a monomer (b112) containing no fluorine or silicon. The monomer (b112) includes, for example, (meth)acrylic acid alkyl ester.

The percentage of the monomer (b111) to the monomer (b11) may fall within the range from 10% by mass to 55% by mass, for example.

The acrylic monomer including a fluoroalkyl group expressed by Formula (1) may include at least one compound selected from the group consisting of:

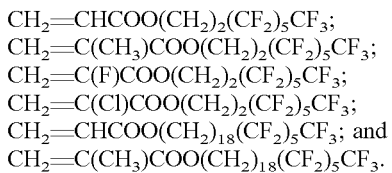

The acrylic segment (a12) is formed by polymerizing together a plurality of radical-polymerizable monomers (b12) containing no fluorine or silicon.

The monomer (b12) such as (meth)acrylic acid alkyl ester (b121) includes at least one compound selected from the group consisting of: methyl (meth)acrylate, ethyl (meth)acrylate, n-butyl (meth)acrylate, t-butyl (meth)acrylate, dodecyl (meth)acrylate, hexadecyl (meth)acrylate, octadecyl (meth)acrylate, 2-ethylhexyl (meth)acrylate, cyclohexyl (meth)acrylate, hydroxyethyl (meth)acrylate, hydroxypropyl (meth)acrylate, glycidyl (meth)acrylate, benzyl (meth)acrylate, (meth)acrylamide, amide N, N-dimethyl (meth)acrylate, N-methylol (meth)acrylamide, N-(meth)acryloylmorpholine, (meth)acrylic acid, (meth)acrylic nitrile, vinyl acetate, styrene, methoxystyrene, N-methylmaleimide, N-ethylmaleimide, N-phenylmaleimide, diisopropyl fumarate, di-t-butyl fumarate, dicyclohexyl fumarate, dibenzyl fumarate, and dimethyl itaconate.

Note that (meth)acrylic acid refers herein to either methacrylic acid or acrylic acid or both of methacrylic acid and acrylic acid.

The monomer (b12) may include, for example, (meth)acrylic acid alkyl ester (b121). The (meth)acrylic acid alkyl ester (b121) may include, for example, a compound expressed by the following Formula (2):

[Chemical Formula 2]

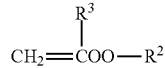

(2)

In Formula (2), $R^2$ represents an alkyl group having 1 to 22 carbon atoms, a substituted alkyl group having 1 to 22 carbon atoms, a cycloalkyl group having 3 to 15 carbon atoms, or a substituted cycloalkyl group having 3 to 15 carbon atoms, a phenyl group, or a substituted phenyl group, and $R^3$ represents a hydrogen atom or a methyl group.

The (meth)acrylic acid alkyl ester (b121) contains at least one compound selected from the group consisting of, for example: methyl methacrylate, stearyl methacrylate, butyl methacrylate, and 2-ethylhexyl methacrylate.

The fluorine-containing copolymer (a1) may include a hydroxyl group. When a fluorine-containing copolymer (a1) having a hydroxyl group is synthesized, the (meth)acrylic acid alkyl ester (b121) may include a (meth)acrylic acid alkyl ester (b1211) having a hydroxyl group. In this case, the (meth)acrylic acid alkyl ester (b1211) may give a hydroxyl group to the acrylic segment (a12). That is to say, the (meth)acrylic acid alkyl ester (b1211) may give a hydroxyl group to the fluorine-containing copolymer (a1). The (meth)acrylic acid alkyl ester (b1211) may contain at least one of 2-hydroxyethyl methacrylate or 2-hydroxypropyl methacrylate, for example.

The monomer (b12) may further contain (meth)acrylic acid (b122). The (meth)acrylic acid (b122) contains at least one of acrylic acid or methacrylic acid, for example.

The fluorine-containing copolymer (a1) may be produced by a known polymerization method for synthesizing a block copolymer, for example.

The silicon-containing copolymer (a2) includes the silicon-containing segment (a21) and the acrylic segment (a22) containing no fluorine or silicon. That is to say, the silicon-containing copolymer (a2) is a block copolymer.

The silicon-containing segment (a21) may have the structure of silicone, for example.

The acrylic segment (a22) may be formed by polymerizing together a plurality of radical-polymerizable monomers (b22) containing no fluorine or silicon, for example. The monomer (b22) may be the same as the monomer (b12) described above, for example.

The monomer (b12) may include, for example, (meth) acrylic acid alkyl ester (b221). The (meth)acrylic acid alkyl ester (b221) may be the same as the (meth)acrylic acid alkyl ester (b121) described above, for example.

The silicon-containing copolymer (a2) may include a hydroxyl group, for example. When a silicon-containing copolymer (a2) having a hydroxyl group is synthesized, the (meth)acrylic acid alkyl ester (b221) may include a (meth) acrylic acid alkyl ester (b2211) having a hydroxyl group. In this case, the (meth)acrylic acid alkyl ester (b2211) may give a hydroxyl group to the acrylic segment (a22). That is to say, the (meth)acrylic acid alkyl ester (b2211) may give a hydroxyl group to the silicon-containing copolymer (a2). The (meth)acrylic acid alkyl ester (b2211) may be the same as the (meth)acrylic acid alkyl ester (b1211) described above.

The monomer (b22) may further contain (meth)acrylic acid (b222). The (meth)acrylic acid (b222) may be the same as the (meth)acrylic acid (b122) described above.

The silicon-containing copolymer (a2) may be produced by a known polymerization method for synthesizing a block copolymer, for example.

The filler (B) will be described. The filler (B) has a mean particle size falling within the range from 10 nm to 200 nm as described above. The mean particle size herein refers to either a mean particle size determined by the BET method or a mean particle size determined by the dynamic light scattering method. The mean particle size determined by the BET method is a volume-based particle size calculated based on the filler's (B) specific surface area measured by the BET method. The mean particle size determined by the dynamic light scattering method is an arithmetic mean of volume-based particle sizes calculated based on the filler's (B) particle size distribution measured by the dynamic light scattering method. That is to say, at least one of the filler's (B) mean particle size determined by the BET method or the filler's (B) mean particle size determined by the dynamic light scattering method falls within the range from 10 nm to 200 nm. If the filler (B) tends to aggregate together easily, the mean particle size determined by the BET method reflects the particle size of the filler (B) more accurately than the mean particle size determined by the dynamic light scattering method.

Setting the mean particle size of the filler (B) at 10 nm or more makes the surface of the antifouling coating film 2 uneven more easily due to the presence of the filler (B). Also, setting the mean particle size of the filler (B) at 200 nm or less reduces the chances of the surface unevenness of the antifouling coating film 2 becoming excessive.

The filler (B) more suitably has a mean particle size falling within the range from 10 nm to 100 nm. Setting the mean particle size of the filler (B) at 100 nm or less reduces the chances of the filler (B) scattering visible light, thus preventing the filler (B) from decreasing the transparency of the antifouling coating film 2 easily. This reduces, particularly when the optical member 10 has the antifouling coating film 2 (see FIG. 1), the chances of the antifouling coating film 2 decreasing the transparency of the optical member 10.

The filler (B) even more suitably has a mean particle size falling within the range from 40 nm to 60 nm. Setting the mean particle size of the filler (B) at 40 nm or more tends to make the surface of the antifouling coating film 2 uneven more easily due to the presence of the filler (B). In addition, setting the mean particle size of the filler (B) at 60 nm or less reduces the chances of the filler (B) coming off the antifouling coating film 2 even when the surface of the antifouling coating film 2 is rubbed, for example.

The material for the filler (B) is not particularly limited. For example, the filler (B) may include particles of an inorganic compound. The filler (B) includes at least one substance selected from the group consisting of metals and metal oxides, for example.

The filler (B) suitably includes at least one substance selected from the group consisting of silica and titania. The filler (B) particularly suitably contains silica. In that case, silica and titania (silica, in particular) do not absorb visible light easily, thus making it less easy for the antifouling coating film 2 made of the antifouling coating composition to absorb visible light. Thus, the antifouling coating film 2 is effectively applicable to the optical member 10 (see FIG. 1). The reason will be described in detail later.

The electrical conductivity imparting component (C) expresses electrical conductivity in the antifouling coating film 2 as described above. The electrical conductivity imparting component (C) may include a material with electrical conductivity. The electrical conductivity imparting component (C) may include a material that turns into an electrically conductive material through chemical reaction, for example, when the antifouling coating film 2 is formed out of the antifouling coating composition.

The electrical conductivity imparting component (C) contains at least one component selected from the group consisting of electrically conductive inorganic particles, electrically conductive resins, and hydrolyzable silicon compounds.

The electrically conductive inorganic particles contain at least one of a metal or an electrically conductive metal oxide, for example.

The electrically conductive inorganic particles may include particles with a mean particle size falling within the range from 10 nm to 100 nm. In that case, the particles with a mean particle size falling within the range from 10 nm to 100 nm are a component included in the electrical conductivity imparting component (C) and a component included in the filler (B) as well.

The electrically conductive resins may include a known material.

The hydrolyzable silicon compound may form polysiloxane with a hydroxyl group through hydrolysis, condensation and polymerization. Polysiloxane may turn electrically conductive when adsorbing water in the air. This allows the hydrolyzable silicon compound to express electrical conductivity in the antifouling coating film 2. The hydrolyzable silicon compound may be expressed by, for example, the following Formula (3):

[Chemical Formula 3]

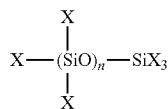

(3)

In Formula (3), X is each independently a halogen atom, a hydroxyl group, an alkoxy group having 1 to 8 carbon atoms, an alkoxyalkyl group, an alkyl group, or an aryl group, and at least one X is a hydroxyl group, a halogen atom, or an alkoxy group having 1 to 8 carbon atoms; and n is an integer equal to or greater than zero. The hydrolyzable silicon compound contains at least one compound selected from the group consisting of, for example, $SiCl_4$, $Si(OC_2H)_4$, $Si(OCH_3)_4$, and an alkyl silicate condensate (for example, Ethyl Silicate 40 manufactured by Colcoat Co., Ltd.).

The electrical conductivity imparting component (C) suitably contains a hydrolyzable silicon compound. In that case, polysiloxane synthesized from the hydrolyzable silicon compound does not absorb visible light easily, thus making it less easy for the antifouling coating film 2 made of the antifouling coating composition to absorb visible light. Thus, the antifouling coating film 2 is effectively applicable to the optical member 10. In addition, the polysiloxane synthesized from the hydrolyzable silicon compound may serve as a binder in the antifouling coating film 2. That is to say, the polysiloxane may hold the resin component (A) and the filler (B) in the antifouling coating film 2. In addition, adding the hydrolyzable silicon compound to the electrical conductivity imparting component (C) allows the antifouling coating film 2 to exhibit good durability, more specifically, good chemical resistance, heat resistance, and light resistance.

At least one of the resin component (A) or the filler (B) suitably has a hydroxyl group and the electrical conductivity imparting component (C) suitably includes a hydrolyzable silicon compound. The resin component (A) and the filler (B) more suitably each include a hydroxyl group. Providing the resin component (A) with a hydroxyl group causes the resin component (A) to react with, and bond to, the hydrolyzable silicon compound when the antifouling coating film 2 is formed out of the antifouling coating composition, thus allowing the resin component (A) to be firmly held by the antifouling coating film 2. Also, providing the filler (B) with a hydroxyl group causes the filler (B) to react with, and bond to, the hydrolyzable silicon compound when the antifouling coating film 2 is formed out of the antifouling coating composition, thus allowing the filler (B) to be firmly held by the antifouling coating film 2. Furthermore, providing each of the resin component (A) and the filler (B) with a hydroxyl group causes the resin component (A) and the filler (B) to react with, and bond to, each other, thus solidifying the antifouling coating film 2 particularly significantly.

To provide the resin component (A) with a hydroxyl group, the resin component (A) needs to contain at least one of, for example, the fluorine-containing copolymer (a1) including a hydroxyl group or the silicon-containing copolymer (a2) including a hydroxyl group. The fluorine-containing copolymer (a1) including a hydroxyl group and the silicon-containing copolymer (a2) including a hydroxyl group are just as described above.

To provide the filler (B) with a hydroxyl group, the filler (B) needs to contain, for example, a metal oxide such as silica or titania. Particles of a metal oxide have a hydroxyl group on their surface.

The solid content in the antifouling coating composition may further contain additional components other than the resin component (A), the filler (B), and the electrical conductivity imparting component (C).

The solid content may contain an additional resin (a3) other than the fluorine-containing copolymer (a1) and the silicon-containing copolymer (a2) as described above. The resin (a3) may be a binder, for example. Adding the resin (a3) serving as a binder to the antifouling coating composition allows the resin (a3) to hold the resin component (A), the filler (B), and the electrical conductivity imparting component (C) in the antifouling coating film 2. Particularly when the electrical conductivity imparting component (C) includes no hydrolyzable silicon compounds, the solid content suitably includes the resin (a3) serving as a binder. The resin (a3) may contain at least one component selected from the group consisting of, for example, acrylic resins, epoxy resins, urethane resins, and silicone resins.

The antifouling coating composition may further contain a solvent. The solvent may include at least one component selected from the group consisting of, for example, aromatic hydrocarbons (such as toluene and xylene), alcohols (such as methanol, ethanol, and isopropyl alcohol), ketones (such as acetone, methyl ethyl ketone, methyl isobutyl ketone, and cyclohexanone), aliphatic hydrocarbons (such as hexane and heptane), ethers (such as tetrahydrofuran), amide solvents (such as N, N-dimethylformamide (DMF) and dimethylacetamide (DMAc)), methyl acetate, and butyl acetate.

The content of the resin component (A) with respect to the solid content in the antifouling coating composition suitably falls within the range from 10% by mass to 30% by mass. Setting the content of the resin component (A) at 10% by mass or more makes it particularly easy to impart oil repellency derived from the resin component (A) to the antifouling coating film 2 formed out of the antifouling coating composition. Setting the content of the resin component (A) at 30% by mass or less increases the chances of the antifouling coating film 2 exhibiting sufficient strength. The content of the resin component (A) suitably falls within the range from 5% by mass to 20% by mass.

The content of the filler (B) with respect to the solid content in the antifouling coating composition suitably falls within the range from 10% by mass to 90% by mass. Setting the content of the filler (B) at 10% by mass or more significantly increases the chances of the surface of the antifouling coating film 2 formed out of the antifouling coating composition coming to have unevenness due to the presence of the filler (B). Setting the content of the filler (B) at 90% by mass or less facilitates forming the antifouling coating composition into the shape of the antifouling coating film 2. The content of the filler (B) suitably falls within the range from 25% by mass to 70% by mass.

The content of the electrical conductivity imparting component (C) with respect to the solid content in the antifouling coating composition suitably falls within the range from 20% by mass to 80% by mass, for example. Particularly when the electrical conductivity imparting component (C) contains a hydrolyzable silicon compound, the content of the hydrolyzable silicon compound with respect to the solid content in the antifouling coating composition suitably falls within the range from 20% by mass to 80% by mass. In that case, polysiloxane formed out of the hydrolyzable silicon compound makes it particularly easy to impart electrical conductivity to the antifouling coating film 2. The content of the hydrolyzable silicon compound suitably falls within the range from 30% by mass to 50% by mass.

If the antifouling coating film 2 is formed out of the antifouling coating composition, then, first, the antifouling coating composition is formed into a film shape. A method for forming the antifouling coating composition may be, for example, a coating method or a printing method. According to the coating method, the antifouling coating composition may be formed using, for example, an air spray, a brush, a bar coater, a Mayer bar, or an air knife. According to the printing method, the antifouling coating composition may be formed by, for example, a gravure printing method, a reverse gravure printing method, an offset printing method, a flexographic printing method, or a screen-printing method.

Next, the film of the antifouling coating composition is solidified or cured by an appropriate method according to the chemical makeup of the antifouling coating composition.

For example, if the electrical conductivity imparting component (C) contains a hydrolyzable silicon compound, the film of the antifouling coating composition is either placed at room temperature or heated, thereby advancing the hydrolysis condensation reaction of the hydrolyzable silicon compound. This also advances the reaction between the hydrolyzable silicon compound and the resin component (A). If the filler (B) has a hydroxyl group, this also advances the reaction between the hydrolyzable silicon compound and the filler (B). If each of the resin component (A) and the filler (B) has a hydroxyl group, this also advances the reaction between the resin component (A) and the filler (B). In this manner, the antifouling coating composition may be cured by hydrolysis reaction. In that case, the components included in the antifouling coating composition do not have to have reactive curing properties (such as photocurable properties) other than the hydrolytic reactivity.

The antifouling coating film 2 has oil repellency, antistatic property, and surface unevenness as described above. In addition, the antifouling coating film 2 may also have water repellency due to the presence of the resin component (A). This reduces the chances of the antifouling coating film 2 being stained with oily substances or gathering dust. Thus, providing various members with the antifouling coating film 2 imparts the members with antifouling properties. The antifouling coating film 2 may be provided for an optical member 10, for example. In addition, the antifouling coating film 2 may also be provided for various members provided indoors such as ceiling fans, TV sets, and shelves and various members provided outdoors such as road signs, bicycles, and windows.

The antifouling coating film 2 may have a thickness falling within the range from 0.1 μm to 100 μm, for example. Its thickness suitably falls within the range from 0.5 μm to 10 μm. Setting the thickness of the antifouling coating film 2 within this range allows the antifouling coating film 2 to have good antifouling properties and sufficient strength.

An optical member 10 and light fixture 100 according to this embodiment will be described with reference to FIG. 1.

The optical member 10 includes a substrate 1 with a light-transmitting property and an antifouling coating film 2 that covers the substrate 1, as shown in FIG. 1. The antifouling coating film 2 may be formed out of the antifouling coating composition according to the exemplary embodiment described above.

The substrate 1 has a light-transmitting property as described above. Particularly, the substrate 1 is suitably able to transmit a visible light ray with a wavelength falling within the range from 380 nm to 780 nm. The substrate 1 may be made of at least one material selected from the group consisting of, for example, acrylic resins, polycarbonate resins, styrene resins, epoxy resins, and glass. Among other things, the substrate 1 is suitably made of at least one material selected from the group consisting of acrylic resins and polycarbonate resins. This will impart a particularly good light-transmitting property to the substrate 1. The substrate 1 suitably has a total light transmittance of 90% to 100% with respect to visible light rays. The total light transmittance may be measured with a spectral haze meter.

The dimensions and shape of the substrate 1 may be designed appropriately according to the intended use of the optical member 10, for example. When the optical member 10 is implemented as a light guide plate 101, the substrate 1 has a plate shape. In that case, the substrate 1 has a thickness of 0.1 mm to 10 mm, for example. To impart sufficient strength and good light-transmitting property to the substrate 1, the substrate 1 suitably has a thickness of 1 mm to 5 mm.

An appropriate method for forming the substrate 1 is selected according to the shape of the substrate 1. For example, if the substrate 1 has a plate shape, then the substrate 1 may be formed by, for example, a sheet forming method such as a glass casting method, a continuous casting method, or an extrusion method.

The antifouling coating film 2 of the optical member 10 covers the substrate 1 at least partially. For example, if the substrate 1 has a plate shape, then the antifouling coating film 2 may cover either a first surface 11 facing one direction along the thickness of the substrate 1 or a second surface 12 located opposite from the first surface 11 or both the first surface 11 and the second surface 12.

FIG. 1 illustrates an example in which the optical member 10 is implemented as a light guide member 101. The substrate 1 of this light guide plate 101 has the shape of a plate with some thickness. The substrate 1 has a first surface 11 facing one direction along the thickness thereof and a second surface 12 located opposite from the first surface 11. On the first surface 11 of the substrate 1, provided are a plurality of prisms 13. The prisms 13 are each formed by the inner surfaces of a recess provided on the first surface 11. In addition, the substrate 1 also has a first end face 15 facing one direction perpendicular to the thickness direction and a second end face 16 located opposite from the first end face 15. The antifouling coating film 2 of the light guide plate 101 covers the first surface 11 of the substrate 1.

As shown in FIG. 1, a light source 20 is arranged to face the first end face 15 of the substrate 1. The light emitted from the light source 20 enters the substrate 1 through the first end face 15 to propagate inside the substrate 1 toward the second end face 16 as indicated by the arrow designated by the reference sign 3. When impinging on the first surface 11 while propagating inside the substrate 1, the light is reflected from the first surface 11 to continue propagating inside the substrate 1. In the same way, when impinging on the second surface 12 while propagating inside the substrate 1, the light is reflected from the second surface 12 to continue propagating inside the substrate 1. Meanwhile, when impinging on one of the prisms 13 on the first surface 11, the angle of incidence of the light on the first surface 11 is changed by the prism 13, thus making it easy for the light to go out of the substrate 1 through the first surface 11 or to go out of the substrate 1 through the second surface 12 after having been reflected from the prism 13. This allows the light to emerge from the entire light guide plate 101.

As the light guide plate 101 is stained, the stain is particularly conspicuous particularly when light emerges from the light guide plate 101. Even while no light is emerging from the light guide plate 101, the stain decreases the transparency of the light guide plate 101, thus affecting the appearance of the light guide plate 101. According to this embodiment, however, the optical member 10 serving as the light guide plate 101 includes the antifouling coating film 2, thus making the light guide plate 101 less easily stainable with oily components or dust, for example. This increases the chances of the light guide plate 101 keeping good appearance.

If the filler (B) includes at least one substance selected from the group consisting of silica and titania (particularly if the filler (B) includes silica), the color of the light emerging from the light guide plate 101 does not change easily depending on the distance from the light source 20. Likewise, if the electrical conductivity imparting component (C) includes a hydrolyzable silicon compound, the color of the light emerging from the light guide plate 101 does not change easily depending on the distance from the light source 20. Furthermore, if the filler (B) includes at least one substance selected from the group consisting of silica and titania and the electrical conductivity imparting component (C) includes a hydrolyzable silicon compound, then the color of the light emerging from the light guide plate 101 does not change easily depending on the distance from the light source 20. This will be described in detail. If the antifouling coating film 2 easily absorbs visible light while the light is propagating inside the substrate 1 of the light guide plate 101, then the light is partially absorbed every time the light impinges on the surface covered with the antifouling coating film 2 (i.e., the first surface 11). Then, the color of the light propagating through the substrate 1 will change according to the wavelength of the light absorbed into the antifouling coating film 2. The longer the distance from the light source 20 is, the more significantly the color changes. Thus, the color of the light emerging from the light guide plate 101 is more and more likely to change as the distance from the light source 20 increases. However, if the filler (B) includes at least one substance selected from the group consisting of silica and titania, then the filler (B) does not absorb visible light easily. Likewise, if the electrical conductivity imparting component (C) includes a hydrolyzable silicon compound, then polysiloxane made of the hydrolyzable silicon compound does not absorb visible light easily. Thus, the antifouling coating film 2 does not absorb visible light easily. This reduces the chances of the color of the light emerging from the light guide plate 101 changing depending on the distance from the light source 20.

Furthermore, if the antifouling coating film 2 does not absorb visible light easily, then the antifouling coating film 2 is not likely to affect the optical properties of the optical member 10. When the optical member 10 is implemented as the light guide plate 101, the antifouling coating film 2 does not easily decrease the transparency of the light guide plate 101 and does not easily interfere with the emergence of the light from the light guide plate 101. This increases the chances of the light guide plate 101 keeping particularly good appearance.

In the example illustrated in FIG. 1, the antifouling coating film 2 covers only the first surface 11. However, this is only an example of the present disclosure and should not be construed as limiting. Alternatively, the antifouling coating film 2 may cover only the second surface 12. Still alternatively, the antifouling coating film 2 may cover both the first surface 11 and the second surface 12.

The optical member 10 does not have to be implemented as the light guide plate 101 described above. Rather the optical member 10 may also be implemented as any other member that transmits light in an optical system. For example, the optical member 10 may be an illuminating cover that covers a light source such as a light-emitting diode to diffuse the light emitted from the light source. In that case, the substrate for the illuminating cover may be a resin plate in which a light diffusing agent is dispersed to impart sufficient light diffusion ability.

The light fixture 100 will be described. The light fixture 100 includes the optical member 10 implemented as the light guide plate 101 and the light source 20 for irradiating the optical member 10 with light.

The type of the light source 20 is not particularly limited. For example, the light source 20 may be a light-emitting diode (LED) or a fluorescent lamp. The light source 20 faces the first end face 15 of the light guide plate 101. When the light emitted from the light source 20 toward the first end face 15 enters the substrate 1 through the first end face 15, the light emerges from the light guide plate 101 as described above. Thus, just providing the light source 20 such that the light source 20 faces the first end face 15 of the light guide plate 101 allows the light to emerge from the entire light guide plate 101.

Figure 2:
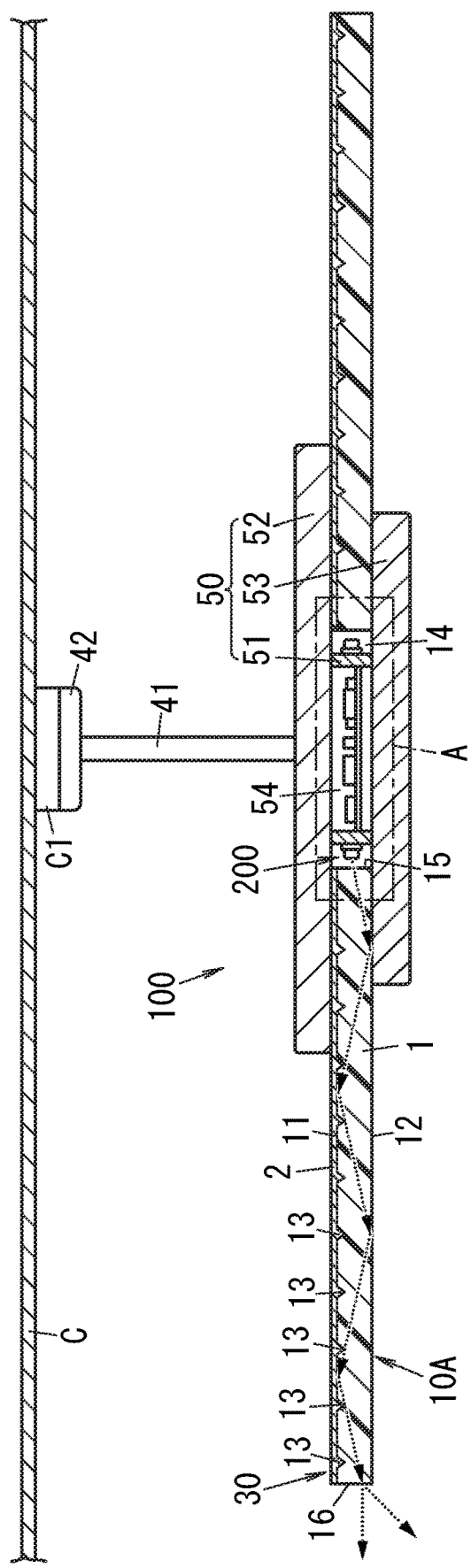
FIG. 2 is a cross-sectional view illustrating a specific example of an optical member and light fixture according to an exemplary embodiment.
Figure 3:
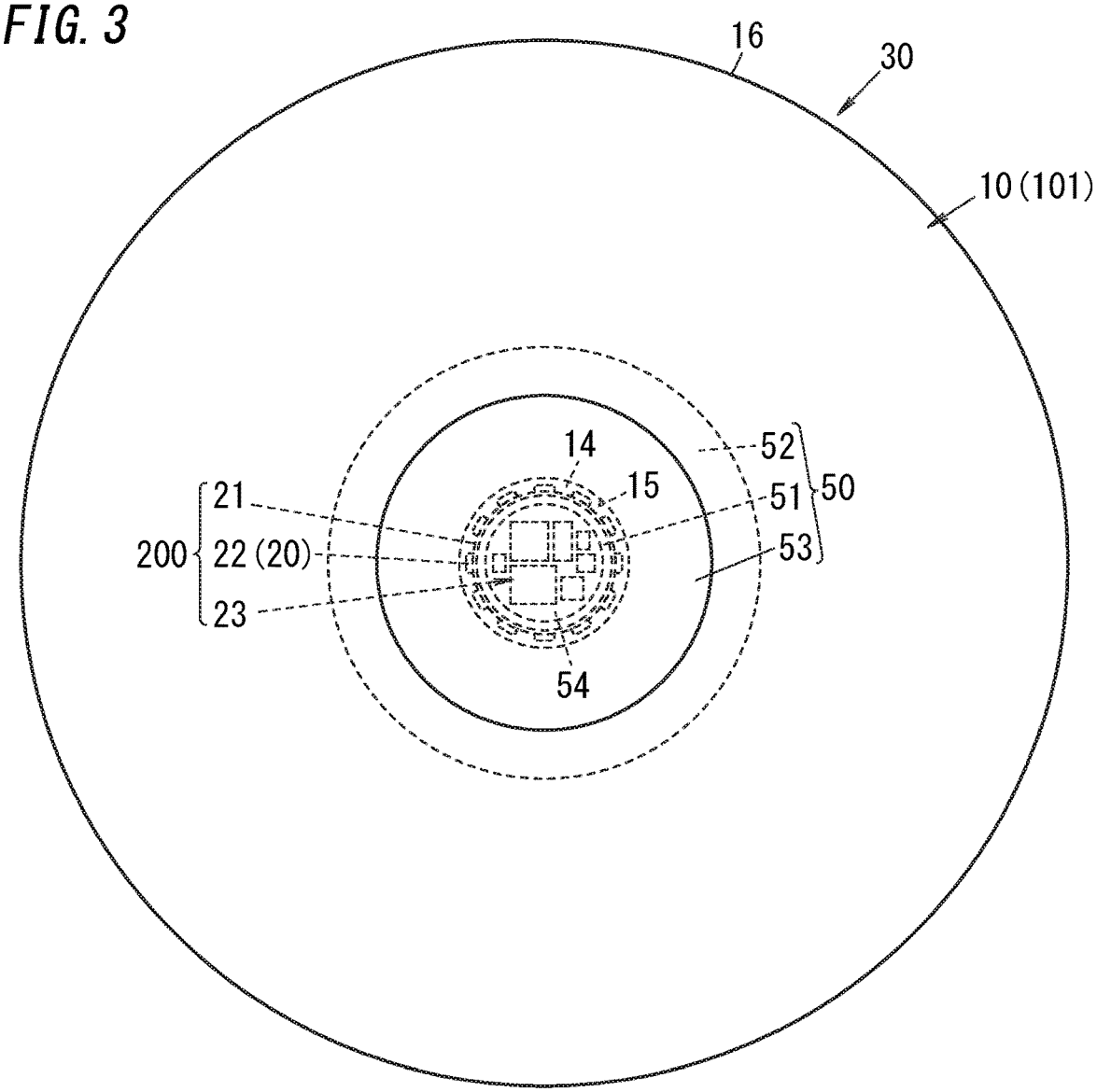
FIG. 3 is a plan view of the light fixture shown in FIG. 2 as viewed upward from under the light fixture.
Figure 4:
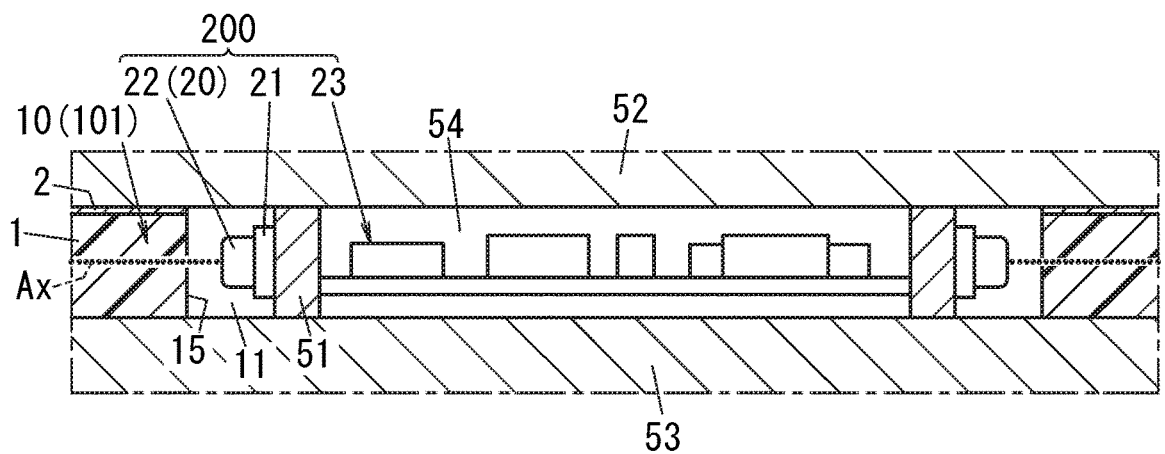
FIG. 4 is an enlarged view of a portion designated by the reference sign A in FIG. 2.

FIGS. 2 to 4 illustrate a more specific example of the light fixture 100. This light fixture 100 is a pendant light installed to be suspended from the ceiling. In the following description, the phrases indicating directions such as "up," "down," and "perpendicular" will be used by reference to a state where the light fixture 100 is installed.

In this light fixture 100, in a state where the light fixture 100 is installed, at least part of the upper surface of the light guide plate 101 and at least part of the lower surface thereof are exposed outside of the light fixture 100.

As shown in FIG. 2, the light fixture 100 includes a device body 30, a power cable 41, and a connector 42. The power cable 41 connects the device body 30 and the connector 42 together. The connector is fixed by being connected to a ceiling rosette C1 provided on the ceiling C. The connector supports the power cable 41. The connector 42 also supports the device body 30. This allows the device body 30 to be suspended and also allows power for energizing the light source 20 to be supplied from the connector 42 to the device body 30 through the power cable 41.

The device body 30 includes: the optical member 10 implemented as the light guide plate 101; a light-emitting device 200 including the light source 20 for irradiating the optical member 10 with light; and a housing 50 for holding the light-emitting device 200 and the light guide plate 101.

As shown in FIGS. 2 and 3, the housing 50 includes a light source holder 51, a first light guide plate holder 52, and a second light guide plate holder 53.

The first light guide plate holder 52 has the shape of a disk having thickness in the upward/downward direction. The second light guide plate holder 53 also has the shape of a disk having thickness in the upward/downward direction and is arranged under the first light guide plate holder 52 to be separated from the first light guide plate holder 52. Each of the first light guide plate holder 52 and the second light guide plate holder 53 is suitably made of a lightweight material with excellent heat dissipation and light reflecting properties such as white polybutylene terephthalate resin.

The light source holder 51 is provided between the first light guide plate holder 52 and the second light guide plate holder 53. The light source holder 51 has an annular shape and has a circular opening 54 running through the light source holder 51 in the upward/downward direction. The outside diameter of the light source holder 51 is smaller than the outside diameter of any of the first light guide plate holder 52 or the second light guide plate holder 53. The light source holder 51 is held by being sandwiched between the first light guide plate holder 52 and the second light guide plate holder 53.

The light guide plate 101 includes: the substrate 1 in the shape of a disk having thickness in the upward/downward direction; and the antifouling coating film 2 that covers the substrate 1. The substrate 1 has the first surface 11 facing upward and the second surface 12 facing downward. The outside diameter of the substrate 1 is larger than the outside diameter of any of the first light guide plate holder 52, the second light guide plate holder 53, or the light source holder 51. The substrate 1 has a circular opening 14 running through the substrate 1 in the upward/downward direction. That is to say, the light guide plate 101 has the opening 14. The center of the opening 14 agrees with the center of the substrate 1. The inside diameter of the opening 14 is smaller than any of the outside diameter of the first light guide plate holder 52 or the second light guide plate holder 53 and larger than the outside diameter of the light source holder 51. The inner peripheral surface of the opening 14 of the substrate 1 defines the first end face 15 and the outer peripheral surface of the substrate 1 defines the second end face 16. A plurality of prisms 13 are provided on the first surface 11 of the substrate 1. The antifouling coating film 2 covers the first surface 11. The light guide plate 101 is held by being sandwiched between the first light guide plate holder 52 and the second light guide plate holder 53. The light source holder 51 is arranged inside the opening 14 of the light guide plate 101.

When the device body 30 is looked up to perpendicularly from under the device body 30 (see FIG. 3), the respective centers of the first light guide plate holder 52, the second light guide plate holder 53, the light source holder 51, and the light guide plate 101 agree with each other. The opening 14 of the light guide plate 101 is located inside of the respective outer peripheries of the first light guide plate holder 52 and the second light guide plate holder 53. The outer periphery of the light guide plate 101 is located outside of the respective outer peripheries of the first light guide plate holder 52 and the second light guide plate holder 53. Thus, except its part held by the housing 50, the upper surface and lower surface of the light guide plate 101 are exposed outside of the device body 30. In addition, the light guide plate 101 is arranged under the ceiling C to be spaced apart from the ceiling C. That is to say, in a state where the light fixture 100 is installed, part of the upper surface and part of the lower surface of the light guide plate 101 are exposed outside of the light fixture 100 and the upper surface of the light guide plate 101 faces the ceiling C over the space.

As shown in FIG. 4, the light-emitting device 200 is held by the light source holder 51. The light-emitting device 200 includes a plurality of LEDs 22 serving as the light source 20, a circuit board 21, and a lighting circuit 23. The lighting circuit 23 controls emission of light from the LEDs 22. The lighting circuit 23 is arranged inside the opening 54 of the light source holder 51. The circuit board 21 is mounted on the outer peripheral surface of the light source holder 51. The circuit board 21 may be implemented as, for example, a flexible circuit board. An insulating sheet with excellent thermal conductivity and electrical conductivity is suitably interposed between the outer peripheral surface of the light source holder 51 and the circuit board 21. The plurality of LEDs 22 are mounted on the circuit board 21. The plurality of LEDs 22 are electrically connected to the lighting circuit 23 via conductor wiring of the circuit board 21 and power cables. The plurality of LEDs 22 are arranged to be spaced apart from each other along the outer peripheral surface of the light source holder 51. Each of the plurality of LEDs 22 faces the first end face 15 of the light guide plate 101 and the optical axis Ax of the light emitted from each of the plurality of LEDs 22 intersects with the first end face 15 of the light guide plate 101. The LEDs 22 may be white LEDs that emit white light, for example.

When the LEDs 22 emit light, the light emitted from the LEDs 22 enters the light guide plate 101 through the first end face 15 as indicated by the dotted arrows in FIG. 2. Thus, the light emerges from the entire light guide plate 101 through the mechanism described above.

In this light fixture 100, while the light source 20 is emitting light, the light emerges from the entire light guide plate 101, thus making the design of the light fixture 100 even more impressive for the viewer. In addition, while the light source 20 is emitting no light, the light guide plate 101 is transparent, thus presenting appearance with full of spaciousness to the viewer's eyes. Particularly when at least part of the upper surface and at least part of the lower surface of the light guide plate 101 are exposed outside of the light fixture 100 and the space is interposed between the light guide plate 101 and the ceiling C as shown in FIG. 2, the space with the light fixture 100 may be designed to look much spacious to the viewer's eyes.

With a space interposed between the light guide plate 101 and the ceiling C as in this light fixture 100, when the upper surface of the light guide plate 101 becomes stained or when the upper surface of the light guide plate 101 gathers dust, it will usually take a lot of time and trouble to clean the light guide plate 101. According to this embodiment, however, the first surface 11, facing upward, of the substrate 1 of the light guide plate 101 is covered with the antifouling coating film 2. This reduces the chances of the upper surface of the light guide plate 101 being stained or gathering dust. This increases the chances of the light guide plate 101 keeping good appearance for a long time.

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure.

For example, the light fixture 100 shown in FIGS. 2-4 is implemented as a pendant light. Alternatively, the light fixture 100 may also be implemented as a ceiling light to be mounted directly on the ceiling. In that case, the light fixture 100 includes no power cable 41 and the connector 42 is directly attached to the device body 30. Furthermore, the light fixture 100 does not have to be mounted on the ceiling but may also be mounted on a wall, on a floor, or even on a piece of furniture. In addition, the shape, position, or number of the light guide plate 101 of the light fixture 100 does not have to be the one described above. Alternatively, the light fixture 100 may include any appropriate number of light guide plates 101 with any appropriate shape at any appropriate position.

EXAMPLES

Next, specific examples of the embodiment described above will be described. Note that the examples of the embodiment to be described below are only examples and should not be construed as limiting.

1. Preparation of Composition

Compositions were prepared by mixing the solid content materials shown in the "solid content composition" column of Table 1 and a solvent (which is an isopropanol, butanol, methyl ethyl ketone, and cyclohexanone mixed solvent) such that the solid content was 3% by mass. Details of the materials are as follows:

Fluorine-containing copolymer 1: a fluorine-containing copolymer having a fluorine-containing segment and an acrylic segment, manufactured by NOF Corporation, product number F3636;

Fluorine-containing copolymer 2: a fluorine-containing copolymer having a fluorine-containing segment and an acrylic segment, manufactured by NOF Corporation, product number F606;

Silicon-containing copolymer 1: a silicon-containing copolymer having a silicon-containing segment and an acrylic segment, manufactured by NOF Corporation, product number FS700;

Silicon-containing copolymer 2: a silicon-containing copolymer having a silicon-containing segment and an acrylic segment, manufactured by NOF Corporation, product number FS730;

Fluororesin 1: a fluororesin having no acrylic segment, manufactured by DIC Corporation, product number F555;

Fluororesin 2: a fluororesin having no acrylic segment, manufactured by Neos Corporation, product number 710FM;

Silica (50 nm): colloidal silica in product number MEK-ST-L, which is an organo-silica sol manufactured by Nissan Chemical Corporation, mean particle size: 50 nm;

Silica (10 nm): colloidal silica in product number MEK-ST-40, which is an organo-silica sol manufactured by Nissan Chemical Corporation, mean particle size: 10 nm;

Silica (100 nm): colloidal silica in product number MEK-ST-ZL, which is an organo-silica sol manufactured by Nissan Chemical Corporation, mean particle size: 100 nm;

Silica (200 nm): silica particles having a mean particle size of 200 nm, product name Sicastar 43-00-202, manufactured by Corefront Corporation;

Titania (50 nm): titania particles having a mean particle size of 50 nm, manufactured by Ishihara Sangyo Kaisha, Ltd., product number TTO-55;

ITO particles (30 nm): tin-doped indium oxide particles having a mean particle size of 30 nm, manufactured by CIK NanoTek Corporation, product name NanoTek ITO;

Hydrolyzable silicon compound: product name Colcoat PX, manufactured by Colcoat Co., Ltd.;

Electrically conductive inorganic particles: antimony-doped tin oxide particles, manufactured by Ishihara Sangyo Kaisha, Ltd., product number FSS-10M;

Electrically conductive resin: product number MC-200 manufactured by Kaken Sangyou Corporation; and Binder: acrylic resin, manufactured by DIC Corporation, product name Acrydic WAL578.

2. Provision of Substrate

An acrylic plate with dimensions of 50 mm×70 mm×2 mm was provided as the substrate.

3. Formation of Optical Member

A composition was applied onto one surface, facing the thickness direction, of the substrate and then heated at 80° C. for 20 minutes to form a coating film with a thickness of 1 μm. In this manner, an optical member including the substrate and the coating film was obtained.

4. Evaluation

Haze

The haze of the optical member was measured with a haze meter. As a result, it may be determined that the light would not be scattered easily when the haze is 3 or less and that the light would be hardly scattered particularly when the haze is 1 or less.

Transmittance

The total light transmittance of visible light ray through the optical member in the thickness direction was measured with a spectral haze meter. It may be determined that when the total light transmittance is 90% or more, the light should not be absorbed easily into the coating film. It may be determined that particularly when the total light transmittance is 92% or more, the light would be hardly absorbed into the coating film.

Antifouling Properties (Adhesion of Dust)

With the surface of the coating film aligned with a horizontal plane, 10 mg of a cotton linter (manufactured by Japan Air Cleaning Association), which is dust for test, was uniformly deposited on the coating film. In this state, a horizontal airflow was allowed to blow at an air velocity of 2 m/s for 30 seconds from a fan (with a diameter of 5 cm) toward the dust. The mass percentage of the amount of dust removed by the airflow from the surface of the coating film to the overall amount of dust was checked. It may be determined that when the percentage of the dust removed is 10% by mass or more, dust would not adhere easily. It may be determined that particularly when the percentage of the dust removed is 35% by mass or more, dust would hardly adhere on the surface.

Contact Angle of Oil

With the surface of the coating film aligned with a horizontal plane, 2 L of oleic acid was dripped onto the coating film and the static contact angle of droplets of the oleic acid was measured in 5 seconds. Note that the static contact angle was measured with a contact angle meter (CA-W150 manufactured by Kyowa Interface Science, Inc.). As a result, it may be determined that oily components would not adhere easily onto the coating film when the static contact angle is 40 degrees or more. It may be determined that oily components would hardly adhere particularly when the static contact angle is 60 degrees or more.

Falling Angle of Oil

As in the oil contact angle test described above, droplets of oleic acid were formed on the coating film. In this state, the optical member was gradually tilted to check the slope angle (i.e., a falling angle) defined by the surface of the coating film with respect to a horizontal plane at a point in time when the droplets started to move on the coating film. As a result, it may be determined that the oily components would not adhere onto the coating film easily when the falling angle is 40 degrees or less. It may also be determined that oily components would hardly adhere onto the coating film particularly when the falling angle is 20 degrees or less.

Note that it may be determined that oily components would not adhere easily onto the coating film if at least one of the oil contact angle or the oil falling angle is rated good.

Contact Angle of Water

With the surface of the coating film aligned with a horizontal plane, 2 L of water was dripped onto the coating film and the static contact angle of droplets of the water was measured in 5 seconds. Note that the static contact angle was measured with a contact angle meter (CA-W150 manufactured by Kyowa Interface Science, Inc.).

Pencil Hardness

The coating film was subjected to a pencil hardness test defined by JIS K5600 5-4.

Sliding Resistance

With a piece of cloth pressed against the coating film with a force of 0.49 kPa (50 gf/cm$^2$), the cloth was rubbed against the coating film 1,500 times. As a result, the coating film receiving no scratches was rated at Grade "A." The coating film receiving some scratches that were not easily recognizable to the eye was rated at Grade "B." The coating film receiving scratches that were easily recognizable to the eye was rated at Grade "C."

Cross-Cut Test

The coating film was subjected to a cross-cut test defined by JIS K5600 5-6. The coating film was rated by how many squares were not separated out of 25 squares.

Light Resistance

The coating film was subjected to a test in which the coating film was irradiated with the light emitted from a metal halide lamp for 1,000 hours. The total light transmittance of visible light ray through the optical member in the thickness direction was measured with a spectral haze meter before and after the test. The coating film, of which the total light transmittance varied by 3% or less as a result of the test, was rated at Grade "A." The coating film, of which the total light transmittance varied by more than 3% as a result of the test, was rated at Grade "C."

Heat Resistance

The optical member was subjected to a test in which the optical member was exposed to a 70° C. atmosphere for 1,000 hours. The total light transmittance of visible light ray through the optical member in the thickness direction was measured with a spectral haze meter before and after the test. The coating film, of which the total light transmittance varied by 3% or less as a result of the test, was rated at Grade "A." The coating film, of which the total light transmittance varied by more than 3% as a result of the test, was rated at Grade "C."

TABLE 1

|  |  | Examples | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| Solid content composition (% by mass) | Fluorine-containing copolymer 1 | 10 | 10 | 10 | 10 | 3 | 10 | 10 |  |  | 10 |
|  | Fluorine-containing copolymer 2 |  |  |  |  |  |  |  |  |  |  |
|  | Silicon-containing copolymer 1 |  |  |  |  |  |  |  | 10 |  |  |
|  | Silicon-containing copolymer 2 |  |  |  |  |  |  |  |  | 10 |  |
|  | Fluororesin 1 |  |  |  |  |  |  |  |  |  |  |
|  | Fluororesin 2 |  |  |  |  |  |  |  |  |  |  |
|  | Silica (50 nm) | 50 | 25 | 70 | 10 | 90 |  |  | 50 | 50 |  |
|  | Silica (10 nm) |  |  |  |  |  |  |  |  |  | 50 |
|  | Silica (100 nm) |  |  |  |  |  |  |  |  |  |  |
|  | Silica (200 nm) |  |  |  |  |  |  |  |  |  |  |
|  | Titania (50 nm) |  |  |  |  |  | 50 |  |  |  |  |
|  | ITO particles (30 nm) |  |  |  |  |  |  | 50 |  |  |  |
|  | Hydrolyzable silicon compound | 40 | 65 | 20 | 80 | 7 | 40 | 40 | 40 | 40 | 40 |
|  | Electrically conductive inorganic particles |  |  |  |  |  |  |  |  |  |  |
|  | Electrically conductive Resin |  |  |  |  |  |  |  |  |  |  |
|  | Binder |  |  |  |  |  |  |  |  |  |  |
| Evaluation | Haze | 0.5 | 0.9 | 0.4 | 0.4 | 0.5 | 0.6 | 0.6 | 0.5 | 0.4 | 0.3 |
|  | Transmittance (%) | 92.8 | 93.4 | 92.9 | 93.2 | 94.4 | 92.1 | 93.6 | 92.7 | 93 | 93 |
|  | Antifouling properties (dust adhesion) (%) | 52.47 | 50.21 | 61.2 | 30.7 | 56.2 | 53.1 | 52 | 53.2 | 54 | 41.5 |
|  | Oil contact angle (degrees) | 85 | 81.7 | 89.7 | 81.1 | 81 | 84 | 84 | 49.3 | 46.8 | 84.6 |
|  | Oil falling angle (degrees) | >45 | >45 | >45 | >45 | >45 | >45 | >45 | 10 | 15 | >45 |
|  | Water contact angle (degrees) | 115 | 113 | 116 | 113 | 114 | 114 | 114 | 105.3 | 93.4 | 112 |
|  | Pencil hardness | 2H | 2H | 2H | 2H | H | 2H | 2H | 2H | 2H | 2H |
|  | Sliding resistance | A | A | B | A | C | A | A | A | A | A |
|  | Cross-cut test | 25/25 | 25/25 | 25/25 | 25/25 | 25/25 | 25/25 | 25/25 | 25/25 | 25/25 | 25/25 |
|  | Light resistance | A | A | A | A | A | A | A | A | A | A |
|  | Heat resistance | A | A | A | A | A | A | A | A | A | A |

TABLE 2

|  |  | Examples | | | | | | Comparative Examples | | | |
| --- | --- | --- | --- | --- | --- | --- | --- | --- | --- | --- | --- |
|  |  | 11 | 12 | 13 | 14 | 15 | 16 | 1 | 2 | 4 | 5 |
| Solid content composition (% by mass) | Fluorine-containing copolymer 1 | 10 | 10 | 10 | 10 |  | 10 |  |  | 10 | 10 |
|  | Fluorine-containing copolymer 2 |  |  |  |  | 10 |  |  |  |  |  |
|  | Silicon-containing copolymer 1 |  |  |  |  |  |  |  |  |  |  |

TABLE 2-continued

|  |  | Examples | | | | | | Comparative Examples | | | |
|---|---|---|---|---|---|---|---|---|---|---|---|
|  |  | 11 | 12 | 13 | 14 | 15 | 16 | 1 | 2 | 4 | 5 |
|  | Silicon-containing copolymer 2 | | | | | | | | | | |
|  | Fluororesin 1 | | | | | | | 10 | | | |
|  | Fluororesin 2 | | | | | | | | 10 | | |
|  | Silica (50 nm) | | 50 | 50 | | 50 | 50 | 50 | 50 | | |
|  | Silica (10 nm) | | | | | | | | | | |
|  | Silica (100 nm) | 50 | | | | | | | | | |
|  | Silica (200 nm) | | | | 50 | | | | | | |
|  | Titania (50 nm) | | | | | | | | | | |
|  | ITO particles (30 nm) | | | | | | | | | | |
|  | Hydrolyzable silicon compound | 40 | | | 40 | 40 | | 40 | 40 | 90 | — |
|  | Electrically conductive inorganic particles | | 20 | | | | | | | | — |
|  | Electrically conductive resin | | | 40 | | | | | | | — |
|  | Binder | | 20 | | | | 40 | | | | 90 |
| Evaluation | Haze | 2.5 | 0.7 | 0.7 | 7.2 | 0.7 | 0.3 | 1 | 3.2 | 0.4 | 0.3 |
|  | Transmittance (%) | 92.8 | 89 | 91 | 89.2 | 92.5 | 92.8 | 92.7 | 91 | 93.5 | 93.1 |
|  | Antifouling properties (dust adhesion) (%) | 58.7 | 54.2 | 47 | 43.3 | 49.2 | 55.1 | 53.2 | 48.1 | 6.19 | 3.21 |
|  | Oil contact angle (degrees) | 84 | 84 | 77.2 | 84 | 80.1 | 82.7 | 42.1 | 46.4 | 78.2 | 79.1 |
|  | Oil falling angle (degrees) | >45 | >45 | >45 | >45 | >45 | >45 | >45 | >45 | >45 | >45 |
|  | Water contact angle (degrees) | 111 | 111 | 104 | 111 | 112 | 114 | 58 | 77 | 107 | 106 |
|  | Pencil hardness | 2H | 2H | H | 2H | 2H | H | 2H | 2H | 2H | H |
|  | Sliding resistance | A | B | B | A | A | B | A | A | A | B |
|  | Cross-cut test | 25/25 | 25/25 | 25/25 | 25/25 | 25/25 | 25/25 | 25/25 | 25/25 | 25/25 | 25/25 |
|  | Light resistance | A | A | B | A | A | A | A | A | A | A |
|  | Heat resistance | A | A | A | A | A | A | A | A | A | A |

As can be seen from the foregoing description of embodiments, an antifouling coating composition according to a first aspect may be used to make an antifouling coating film (2). The antifouling coating composition contains a solid content which is a constituent component of the antifouling coating film (2). The solid content contains a resin component (A), and a filler (B). The resin component (A) includes at least one of a fluorine-containing copolymer (a1) or a silicon-containing copolymer (a2). The fluorine-containing copolymer (a1) includes a fluorine-containing segment and an acrylic segment containing no fluorine or silicon. The silicon-containing copolymer (a2) includes a silicon-containing segment and an acrylic segment containing no fluorine or silicon. The filler (B) has a mean particle size falling within a range from 10 nm to 200 nm.

The first aspect provides an antifouling coating composition that may be used to make an antifouling coating film that reduces adhesion of dust and oily components.

An antifouling coating composition according to a second aspect, which may be implemented in conjunction with the first aspect, further includes an electrical conductivity imparting component (C) expressing electrical conductivity in the antifouling coating film.

In an antifouling coating composition according to a third aspect, which may be implemented in conjunction with the first or second aspect, the mean particle size of the filler (B) falls within a range from 10 nm to 100 nm.

In an antifouling coating composition according to a fourth aspect, which may be implemented in conjunction with any one of the first to third aspects, the filler (B) includes at least one substance selected from the group consisting of silica and titania.

In an antifouling coating composition according to a fifth aspect, which may be implemented in conjunction with any one of the first to fourth aspects, the electrical conductivity imparting component (C) contains at least one substance selected from the group consisting of electrically conductive inorganic particles, electrically conductive resins, and hydrolyzable silicon compounds.

In an antifouling coating composition according to a sixth aspect, which may be implemented in conjunction with any one of the first to fifth aspects, content of the filler (B) with respect to the solid content falls within a range from 10% by mass to 90% by mass.

An optical member (10) according to a seventh aspect includes: a substrate (1) having light transmitting properties; and an antifouling coating film (2) covering the substrate (1) and made of the antifouling coating composition according to any one of the first to sixth aspects.

The seventh aspect provides an optical member including an antifouling coating film that reduces adhesion of dust and oily components.

In an optical member (10) according to an eighth aspect, which may be implemented in conjunction with the seventh aspect, the substrate (1) has a plate shape and the optical member (10) serves as a light guide plate (101).

A light fixture (100) according to a ninth aspect includes: the optical member (10) according to the seventh aspect; and a light source (20) to irradiate the optical member (10) with light.

The ninth aspect provides a light fixture including an optical member with an antifouling coating film that reduces adhesion of dust and oily components.

REFERENCE SIGNS LIST

1 Substrate
10 Optical Member
101 Light Guide Plate

100 Light Fixture
2 Antifouling Coating Film
20 Light Source

The invention claimed is:

1. An antifouling coating composition for use to make an antifouling coating film, the antifouling coating composition containing a solid content which is a constituent component of the antifouling coating film,
   the solid content containing a resin component (A), a filler (B) and an electrical conductivity imparting component (C),
   the resin component (A) including a fluorine-containing copolymer (a1) with or without a silicon-containing copolymer (a2), the fluorine-containing copolymer (a1) including a fluorine-containing segment and an acrylic segment containing no fluorine or silicon, the silicon-containing copolymer (a2) including a silicon-containing segment and an acrylic segment containing no fluorine or silicon;
   the filler (B) having a mean particle size falling within a range from 10 nm to 200 nm,
   the electrical conductivity imparting component (C) expressing electrical conductivity in the antifouling coating film and containing hydrolyzable silicon compounds.

2. The antifouling coating composition of claim 1, wherein
   the mean particle size of the filler (B) falls within a range from 10 nm to 100 nm.

3. The antifouling coating composition of claim 1, wherein
   the filler (B) includes at least one substance selected from the group consisting of silica and titania.

4. The antifouling coating composition of claim 1, wherein
   content of the filler (B) with respect to the solid content falls within a range from 10% by mass to 90% by mass.

5. An optical member comprising:
   a substrate having light transmitting properties; and
   an antifouling coating film covering the substrate and made of the antifouling coating composition of claim 1.

6. The optical member of claim 5, wherein
   the substrate has a plate shape, and
   the optical member serves as a light guide plate.

7. A light fixture comprising:
   the optical member of claim 5; and
   a light source configured to irradiate the optical member with light.

8. The antifouling coating composition of claim 1, wherein
   the hydrolyzable silicon compound is expressed by the following Formula (3):

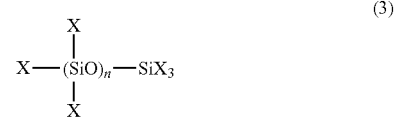

(3)

in the Formula (3), X being each independently a halogen atom, a hydroxyl group, an alkoxy group having 1 to 8 carbon atoms, an alkoxyalkyl group, an alkyl group, or an aryl group, and at least one X being a hydroxyl group, a halogen atom, or an alkoxy group having 1 to 8 carbon atoms; and n being an integer equal to or greater than zero.

* * * * *